United States Patent [19]

Peccoux et al.

[11] Patent Number: 4,918,121
[45] Date of Patent: Apr. 17, 1990

[54] CURABLE ORGANOPOLYSILOXANE COMPOSITIONS COMPRISING A HYDROGEL HARDENING AGENT

[75] Inventors: Pierre-Michel Peccoux, Lyons; Gilbert Schorsch, Colombes, both of France

[73] Assignee: Rhone-Poulenc Chimie, Courbevoie, France

[21] Appl. No.: 260,015

[22] Filed: Oct. 20, 1988

[30] Foreign Application Priority Data

Oct. 20, 1987 [FR] France ................................. 87 14749

[51] Int. Cl.$^4$ ............................................. C08L 89/00
[52] U.S. Cl. ........................................ 524/27; 524/28; 524/42; 524/45; 524/44; 524/55; 525/100; 525/460
[58] Field of Search ................. 525/100, 460; 524/27, 524/28, 42, 45, 55, 44

[56] References Cited

U.S. PATENT DOCUMENTS

| 4,508,888 | 4/1985 | Letoffe et al. | 528/23 |
| 4,532,315 | 7/1985 | Letoffe et al. | 528/14 |
| 4,684,697 | 8/1987 | Chang et al. | 525/100 |
| 4,696,974 | 9/1987 | Sule et al. | 525/100 |

FOREIGN PATENT DOCUMENTS 0022976 1/1981 European Pat. Off. .

Primary Examiner—Melvyn I. Marquis
Attorney, Agent, or Firm—Burns, Doane, Swecker & Mathis

[57] ABSTRACT

Organopolysiloxane compositions curable into elastomeric state even in the absence of atmospheric moisture, notably in a confined environment, and well adopted for the production of seals, include an acyloxy crosslinking agent and a natural or synthetic hydrogel hardening agent.

17 Claims, No Drawings

CURABLE ORGANOPOLYSILOXANE COMPOSITIONS COMPRISING A HYDROGEL HARDENING AGENT

CROSS-REFERENCE TO COMPANION APPLICATION

Our copending application, Ser. No. 260,018, filed Oct. 20, 1988 and assigned to the assignee hereof.

BACKGROUND OF THE INVENTION

1. Field of the Invention:

The present invention relates to improved organopolysiloxane compositions curable into elastomeric state, even in a confined atmosphere, and, more especially, to improved organopolysiloxane compositions comprising an acyloxy crosslinking agent and a natural or synthetic hydrogel hardening agent.

2. Description of the Prior Art:

Compositions of the above general type, with optionally accelerated curing, and comprising acyloxy radicals, are known to this art. They are described, in particular, in British Patent No. GB-A-1,308,985, where the hardening agent is a zeolite containing water, and in European Patent Nos. EP-A-118,325 and EP-A-117,772, where the hardening agent is selected, respectively, from an alkali and alkaline earth metal hydroxide, or else from a mixture of water and an alkali or alkaline earth metal phosphate and/or polyphosphate.

These compositions are stable in storage only if they are maintained separately apart as 2 components (or in 2 packages). In fact, the hardening agent, packaged in one of the 2 components, contains water and can release and/or produce water during the mixing of the 2 components, which is generally followed by heating.

In addition, these compositions have a rather short crosslinking (or curing) time, on the order of a few minutes to 60 minutes. This crosslinking is, furthermore, independent of the moisture content of the surrounding atmosphere, since the water may be contributed solely by the crosslinking agent.

These compositions are therefore more particularly employed in fields of application where this property is particularly advantageous, such as, for example, the production of "in situ" seals in the motor-vehicle industry.

The above characteristics permit these compositions to be clearly distinguished from the single-component compositions containing acyloxy or ketiminoxy radicals, which are stable in storage and which cure merely on contact with atmospheric moisture (see, for example, FR-A-No. 1,193,271; US-A-No. 3,061,575; FR-A-No. 2,429,811; EP-A-No. 102,268; EP-A-No. 157,580 and DE-A-No. 3,524,452).

In the case of industrial applications involving the continuous deposition of seals, an automatic tool is generally used for depositing a two-component diorganopolysiloxane composition (with 2 components) which has a mixing head equipped with a deposition nozzle, the latter translating along the outline of the seals to be produced.

In order to avoid the composition setting solid in the mixing head, which is maintained at ambient temperature, during its operation or during stoppages on a continuous sealing line, it would be desirable to have access to a composition exhibiting, on the one hand, a slow crosslinking at high ambient temperature (longer than at least about ten minutes) after the two components have been mixed, namely, after mixing the cure accelerator and, on the other hand, a very fast crosslinking of the seal after it has been deposited.

Complete control of the crosslinking time at ambient temperature would make it possible to stop a continuous sealing line without the need for purging the mixing head. A fairly slow setting at ambient temperature would also be beneficial for obtaining a suitable adhesiveness of the seal to the substrates, because the composition would spread readily on these substrates with a sufficiently long contact time to ensure proper wetting of the surface, since the adhesiveness of the seals to the substrates is frequently an essential property of the seal.

It is also desirable to have available a composition which sets rapidly under the influence of a temperature increase which is as low as possible. In point of fact, a moderate temperature increase would make it possible to maintain high production rates on continuous industrial sealing lines.

In respect of the elastomer obtained, a composition of this type would also have to provide good mechanical properties, particularly when heated and in a confined atmosphere, with regard to the residual compression set (RCS).

The known compositions with optionally accelerated curing do not exhibit the combination of the desired properties referred to above. In fact, the compositions in which the hardening agent is zinc oxide and water, or else zeolites, do not exhibit satisfactory mechanical properties, especially when heated in a confined atmosphere.

The compositions described in European Patent Nos. EP-A-118,325 and EP-A-117,772 represent a very considerable progress with regard to the retention of mechanical properties when heated in a confined atmosphere, and have presented the possibility of employing these compositions for adhesive bonding or for sealing components travelling on industrial assembly lines, or in the case of which there are no available storage areas which would ensure their complete cure. However, these compositions can exhibit a setting time at ambient temperature which is too short and an adhesiveness to the substrate, in particular a metallic substrate, which may be inadequate.

SUMMARY OF THE INVENTION

Accordingly, a major object of the present invention is the provision of improved curable organopolysiloxane compositions which exhibit that combination of desired properties referred to above.

Briefly, the present invention features novel organopolysiloxane compositions curable into elastomeric state even in the absence of atmospheric moisture, in particular in a confined atmosphere, and which comprise:

(A) 100 parts by weight of principally $\alpha,\omega$-di(hydroxy)diorganopolysiloxane polymers having a viscosity of 700 to 1,000,000 mPa.s at 25° C., each comprising recurring diorganosiloxy units of the formula $R_2SiO$ in which the symbols R, which are identical or different, are each a hydrocarbon radical containing from 1 to 8 carbon atoms, or a substituted such radical bearing one or more halogen atom or cyano substituents;

(B) 2 to 20 parts by weight of a crosslinking agent having the general formula:

in which the symbol R is as defined above under (A), the symbol R' is a hydrocarbon radical devoid of aliphatic unsaturation, containing from 1 to 15 carbon atoms, and the symbol p represents zero or one;

(C) 0 to 150 parts by weight of inorganic fillers; and (D) 0.01 to 10, preferably 0.05 to 2 parts by weight, per 100 parts by weight of (A)+(B)+(C), of a hydrogel comprising one part by weight of a coagulated colloid of natural or synthetic origin and at least five parts by weight of water.

DETAILED DESCRIPTION OF THE PREFERRED EMBODIMENTS OF THE INVENTION

More particularly according to the invention, by the term "hydrogel" is intended a gel which contains water, this gel originating from the coagulation of a colloid with the inclusion of water. The colloid may be of natural or synthetic origin.

The coagulated colloid, preferably insoluble in water, forms a physical or chemical gel and has the capacity of absorbing large amounts of water in its macromolecular lattice. This property enables the introduction of only very small amounts of colloid into the organopolysiloxane composition.

These very small amounts have no effect, or only a negligible effect, on the final properties of the silicone elastomer produced after crosslinking.

On the other hand, these hydrogels present the advantage of providing an effective and easily applied mechanism for dispersing water homogeneously within the composition.

According to the present invention, it is possible to employ hydrogels of natural origin, in which the macromolecular lattice is generally a polysaccharide, such as agar-agar, gelose, alginate, carboxymethyl cellulose such as described in particular in U.S. Pat. No. 3,589,364, hydroxyethyl cellulose, methyl cellulose, gelled cellulose triacetate such as described especially in U.S. Pat. Nos. 1,693,890 and 3,846,404, polyacrylonitrile-grafted starch such as described especially in U.S. Pat. Nos. 3,935,099 and 3,661,815, and acrylic acid-grafted starch such as described in FR-A-No. 2,305,452.

Also according to the present invention, it is also possible to employ hydrogels of synthetic origin, in which the macromolecular lattice comprises polymers of hydroxyethyl methacrylate, crosslinked polyvinyl alcohol, polyacrylamide, partially hydrolyzed polyvinyl acetate, hydroxyethyl acrylate, diethylene glycol monoacrylate, diethylene glycol monomethacrylate, 2-hydroxypropyl acrylate, 2-hydroxypropyl methacrylate, 3-hydroxypropyl acrylate, 3-hydroxypropyl methacrylate, dipropylene glycol monomethacrylate, vinylpyrrolidone, acrylamide, methacrylamide, N-propylacrylamide, N-isopropylmethacrylamide, N-methylacrylamide, N-2-hydroxyethylmethacrylamide, polyurethane hydrogels comprising lightly crosslinked polymers of prepolymers terminating in an isocyanate, which are the products of reaction of a poly(alkyleneoxy)polyol with an organic diisocyanate lightly crosslinked with water or an organic polyamine, as described in U.S. Pat. No. 3,939,105, copolymers of ethylenically unsaturated monomers of hydroxyalkyl acrylates and methacrylates and of alkoxyalkylene glycol acrylates and methacrylates, as described in U.S. Pat. No. 4,038,264, resins of the polyether-polyurethane type produced by reaction of an organic diisocyanate with a mixture of at least two diols, one of which is a water-soluble polyalkylene glycol having a molecular weight of from 3,000 to 30,000 and in which the second is an oxyalkylated diphenol having 2 to 20 oxyalkylene groups, as well as other such hydrogels known to this art.

Particularly preferred are hydrogels in which the water-insoluble coagulated colloid comprises carboxylate groups, in particular acrylate and/or methacrylate of an alkali metal, in particular sodium, per 1 part by weight of colloid and comprising at least 20 parts, preferably at least 50 parts by weight of water.

Even more especially preferred according to this invention are the polymers of an alkali metal (in particular sodium) acrylate which are prepared by the polymerization of acrylic acid and of alkali metal acrylate in aqueous suspension, such as described especially in European Patent Nos. EP-A-36,463 and EP-A-83,222, hereby incorporated by reference.

The polymers (A) having a viscosity of 700 to 1,000,000 mPa.s at 25° C., preferably 1,000 to 700,000 mPa.s at 25° C., are essentially linear polymers comprising diorganosiloxy units of the above-mentioned formula $R_2SiO$, and blocked by a hydroxyl group at each end of their polymer chain; however, the presence of monoorganosiloxy recurring units of the formula $RSiO_{1.5}$ and/or of siloxy units of formula $SiO_2$ is not excluded, in a proportion not exceeding 2% relative to the number of diorganosiloxy units.

The hydrocarbon radicals containing from 1 to 8 carbon atoms, whether unsubstituted or substituted by halogen atoms or cyano groups, and represented by the symbols R, are advantageously selected from among:

(i) alkyl and haloalkyl radicals containing from 1 to 8 carbon atoms, such as methyl, ethyl, n-propyl, isopropyl, n-butyl, n-pentyl, n-hexyl, 2-ethylhexyl, n-octyl, 3,3,3-trifluoropropyl, 4,4,4-trifluorobutyl or 4,4,4,3,3-pentafluorobutyl radicals;

(ii) cycloalkyl and halocycloalkyl radicals containing from 4 to 8 carbon atoms, such as cyclopentyl, cyclohexyl, methylcyclohexyl, 2,3-difluorocyclobutyl, or 3,4-difluoro-5-methylcycloheptyl radicals;

(iii) alkenyl radicals containing from 2 to 4 carbon atoms, such as vinyl, allyl or 2-butenyl radicals;

(iv) aryl and haloaryl radicals containing from 6 to 8 carbon atoms, such as phenyl, tolyl, xylyl, chlorophenyl, dichlorophenyl or trichlorophenyl radicals; and (v) cyanoalkyl radicals in which the alkyl moiety contains from 2 to 3 carbon atoms such as β-cyanoethyl and γ-cyanopropyl radicals.

Exemplary of the units of the formula $R_2SiO$, representative are those of the formulae:

$(CH_3)_2SiO$ $CH_3(CH_2=CH)SiO$ $CH_3(C_6H_5)SiO$ $(C_6H_5)_2SiO$ $CF_3CH_2CH_2(CH_3)SiO$ $NC-CH_2CH_2(CH_3)SiO$ $NC-CH(CH_3)CH_2(CH_2=CH)SiO$ $NC-CH_2CH_2CH_2(C_6H_5)SiO$

It should be appreciated, in an alternative embodiment of the invention, that the polymers (A) may be copolymers or a mixture of α,ω-di(hydroxy)diorganopolysiloxane polymers which differ from each other in molecular weight and/or in the nature of the groups bonded to the silicon atoms.

These α,ω-di(hydroxy)diorganopolysiloxane copolymers (A) are commercially available; in addition, they are easily produced.

The crosslinking agents (B) are employed in a proportion of 2 to 20 parts, preferably from 3 to 15 parts by weight, per 100 parts by weight of the α,ω-di(hydroxy)-diorganopolysiloxane polymers (A).

They correspond to the above-mentioned formula:

$$R_p Si(OCOR')_{4-p}$$

in which, as above indicated, the symbol R is as defined under (A), the symbol R' is a hydrocarbon radical devoid of aliphatic unsaturation, containing from 1 to 15 carbon atoms, and the symbol p represents zero or 1.

The particulars of the radicals represented by the symbol R have been given above. As regards the symbol R', this is advantageously selected from among:

(i) alkyl radicals containing from 1 to 15 carbon atoms, such as methyl, ethyl, n-propyl, n-butyl, n-pentyl, 1-ethylpentyl, n-hexyl, 2-ethylhexyl, n-octyl, neodecyl, n-decyl, n-dodecyl or n-pentadecyl radicals;

(ii) cycloalkyl radicals containing from 5 to 6 ring carbon atoms, such as cyclopentyl and cyclohexyl radicals; and (iii) aryl radicals containing from 6 to 8 carbon atoms, such as phenyl, tolyl or xylyl radicals.

Exemplary of the crosslinking agents (B), representative are those of the following formulae:

```
CH3Si(OCOCH3)3
C2H5Si—(OCOCH3)3
CH2=CHSi(OCOCH3)3
C6H5Si—(OCOCH3)3

CH3Si[OCOCH(CH2)3CH3]3
         |
         C2H5

CF3CH2CH2Si(OCOC6H5)3
CH3Si(OCOC6H5)3

CH3Si(OCOCH3)2(OCOCH—(CH2)3CH3)
                  |
                  C2H5

CH3COOSi[OCOCH—(CH2)3CH3]3
            |
            C2H5
```

It will be appreciated that the constituents (A) and (B) in the compositions of the invention may be replaced with the equivalent devolatilized products emanating from the stoichiometric reaction of (A) with (B).

The inorganic fillers (C) are employed in a proportion of 0 to 150 parts, preferably 10 to 120 parts by weight, per 100 parts by weight of the α,ω-di(hydroxy)-diorganopolysiloxane polymers (A). These fillers may be in the form of very finely divided materials whose mean particle diameter is below 0.1 μm. These fillers include pyrogenic silicas and precipitated silicas; their specific surface area is generally greater than 40 m²/g, and most typically ranges from 150–200 m²/g.

These fillers may also be in the form of more coarsely divided materials, having a mean particle diameter greater than 0.1 μm. Examples of such fillers are ground quartz, diatomaceous silicas, calcium carbonate, calcined clay, rutile-type titanium dioxide, iron, zinc, chromium, zirconium and magnesium oxides, various forms of alumina (hydrated or otherwise), boron nitride, lithopone and barium metaborate; their specific surface area is generally below 30 m²/g.

The fillers (C) may have been surface-modified by treatment with the various organosilicon compounds usually employed for this purpose. Thus, such organosilicon compounds may be organochlorosilanes, diorganocyclopolysiloxanes, hexaorganodisiloxanes, hexaorganodisilazanes or diorganocyclopolysilazanes (French Patent Nos. FR-A-1,126,884, FR-A-1,136,885, FR-A-1,236,505 and British Patent No. GB-A-1,024,234). In most cases, the treated fillers contain from 3 to 30% of their weight of organosilicon compounds.

The fillers (C) may comprise a mixture of a number of types of fillers of different particle size; thus, for example, they may comprise 30 to 70% of finely divided silicas having a specific surface area greater than 40 m²/g and of 70 to 30% of more coarsely divided silicas having a specific surface area below 30 m²/g.

The organopolysiloxane compositions in accordance with this invention may, in addition to the constituents (A), (B), (C) and (D), contain curing catalysts which are typically selected from among:

(i) metal salts of carboxylic acids, preferably organotin salts of carboxylic acids such as dibutyltin diacetate and dilaurate;

(ii) products of reaction of organotin salts of carboxylic acids with titanic esters (U.S. Pat. No. 3,409,753);

(iii) tin chelates (European Patent No. EP-A-147,323); and (iv) organic titanium and zirconium derivatives such as titanic and zirconic esters (U.S. Pat. No. 4,525,565).

These curing catalysts are usually employed in a proportion of 0.0004 to 6 parts, preferably from 0.0008 to 5 parts by weight, per 100 parts by weight, of the α,ω-di(hydroxy)diorganopolysiloxane polymers (A).

The organopolysiloxane compositions may also comprise the usual adjuvants and additives, including heat stabilizers in particular. These latter products, whose presence improves the heat resistance of the silicone elastomers, may be selected from among the rare-earth salts, oxides and hydroxides (and more especially among ceric oxides and hydroxides), or from titanium and iron oxides, preferably obtained by combustion.

Advantageously, the compositions according to the invention contain from 0.1 to 15 parts, and preferably from 0.15 to 12 parts by weight, of heat stabilizers per 100 parts by weight of the α,ω-di(hydroxy)diorganopolysiloxane polymers (A).

Compounds which improve flame resistance may be mentioned as other additives; they are preferably selected from among organic and inorganic platinum derivatives.

In addition to the principal constituents (A), (B), (C), (D) and the above-mentioned additives, special organopolysiloxane compounds may be introduced with the objective of favorably influencing the physical characteristics of the compositions in accordance with the invention and/or the mechanical properties of the elastomers produced by curing such compositions.

These organopolysiloxane compounds are well known to this art; more especially, they comprise:

(1f) α,ω-Bis(triorganosiloxy)diorganopolysiloxane and/or α-(hydroxy), ω-(triorganosiloxy)diorganopolysiloxane polymers having viscosities of at least 10 mPa.s at 25° C., essentially comprising diorganosiloxy recurring units and not more than 1% of monoorganosiloxy and/or siloxy recurring units, the organic radicals bonded to the silicon atoms being methyl, vinyl and phenyl radicals, at least 60% of these organic radicals being methyl radicals and not more than 10% being vinyl radicals.

The viscosity of these polymers may reach several tens of millions of mPa.s at 25° C.; they include, therefore, fluid to viscous oils and soft to hard resins. They are prepared according to the usual techniques, described more precisely in French Patent Nos. FR-A-978,058, FR-A-1,025,150, FR-A-1,108,764 and FR-A-1,370,884. α,ω-Bis(trimethylsiloxy)dimethylpolysiloxane oils having a viscosity ranging from 10 mPa.s to 1,000 mPa.s at 25° C. are preferably used. These polymers, which serve as plasticizers, may be introduced in a proportion not exceeding 150 parts, preferably 5 to 120 parts by weight, per 100 parts by weight of the α,ω-di(hydroxy)diorganopolysiloxane polymers (A).

(2f) Branched, liquid methyl polysiloxane polymers containing from 1.4 to 1.9 methyl radicals per silicon atom, comprising a combination of recurring units of the formulae:

$(CH_3)_3SiO_{0.5}$ $(CH_3)_2SiO$ and $CH_3SiO_{1.5}$

They contain from 0.1 to 8% of hydroxyl groups. They may be prepared by hydrolysis of the corresponding chlorosilanes, as described in French Patent Nos. FR-A-1,408,662 and FR-A-2,429,811. Branched polymers are preferably used, in which the recurring units are distributed according to the following ratios:

$(CH_3)SiO_{0.5}/(CH_3)_2SiO = 0.01$ to $0.15$ and $(CH_3SiO_{1.5}/(CH_3)_2SiO = 0.1$ to $1.5$ These polymers may be incorporated in a proportion not exceeding 70 parts, preferably from 3 to 50 parts by weight, per 100 parts by weight of the α,ω-di(hydroxy)-diorganopolysiloxane polymers (A). They impart thixotropic properties, particularly with the treated silicas.

(3f) Diorganopolysiloxane oils blocked with hydroxyl and/or lower alkoxy groups containing from 1 to 4 carbon atoms, having a low viscosity generally within the range of 2 mPa.s to 40,000 mPa.s at 25° C. (when these oils are only blocked by hydroxyl groups, their viscosity is below 700 mPa.s at 25° C.); the organic radicals bonded to the silicon atoms of these oils are, as before, methyl, vinyl and phenyl radicals, at least 40% of these radicals being methyl radicals and not more than 10% being vinyl radicals.

Methoxy, ethoxy, isopropoxy, n-propoxy, n-butoxy, isobutoxy and tert-butoxy groups are representative of the chain-blocking lower alkoxy groups. The proportions of hydroxyl and/or alkoxy groups generally range from 0.5 to 20%. These oils are prepared according to the usual techniques described more precisely in French Patent Nos. FR-A-938,292, FR-A-1,104,674, FR-A-1,116,196, FR-A-1,278,281 and FR-A-1,276,619. α,ω-Di(hydroxydimethyl)polysiloxane oils having a viscosity of 10 to 300 mPa.s at 25° C., are preferably used, as are α,ω-dihydroxymethylphenylpolysiloxane oils having a viscosity of 200 to 600 mPa.s at 25° C., and α,ω-dimethoxy(or diethoxy)dimethylpolysiloxane oils having a viscosity of 30 to 2,000 mPa.s at 25° C. They may be introduced in a proportion not exceeding 50 parts, preferably from 2 to 40 parts by weight, per 100 parts by weight of α,ω-di(hydroxy)diorganopolysiloxane polymers (A). These oils permit the overall viscosity to be reduced and, according to the usual expression, are considered to be "process aids", together with the oils (2f).

(4f) Hydroxylated organosilicon compounds having the general formula:

$Z'SiZ_2(OSiZ_2)_wOH$ which are solid at ambient temperature. In this formula, the symbols Z, which may be identical or different, are each methyl, ethyl, n-propyl, vinyl or phenyl radicals, the symbol Z' is a hydroxyl radical or Z and the symbol w is zero, 1 or 2.

Exemplary of such compounds are diphenylsilanediol, methylphenylsilanediol, dimethylphenylsilanol, 1,1,3,3-tetramethyldisiloxanediol, 1,3-dimethyl-1,3-diphenyldisiloxanediol and 1,1,5,5-tetramethyl-3,3-diphenyltrisiloxanediol. They may be introduced in a portion not exceeding 30 parts, preferably 0.5 to 20 parts by weight, per 100 parts by weight of the α,ω-di(hydroxy)diorganopolysiloxane polymers (A). They impart thixotropic properties to the medium, which generally gels slightly because of the action thereof.

The α,ω-bis(triorganosiloxy)diorganopolysiloxane and/or α-(hydroxy), ω-(triorganosiloxy)diorganopolysiloxane polymers described under (1f) may be completely or partially replaced with organic compounds which are inert in respect of the constituents (A), (B), (C) and (D) and which are miscible at least with the α,ω-di(hydroxy)diorganopolysiloxane polymers (A).

Specific examples of organic plasticizers which are representative are petroleum cuts having a boiling point above 200° C., comprising a mixture of aliphatic and/or aromatic hydrocarbons, polybutylenes, preferably of low molecular weight, as described in French Patent Nos. FR-A-2,254,231, FR-A-2,293,831 and FR-A-2,405,985, alkylation products, particularly of benzene, polyalkylbenzenes obtained by alkylation of benzene with linear or branched long chain olefins, particularly olefins containing 12 carbon atoms, produced by propylene polymerization, as described, for example, in French Patent No. FR-A-2,446,849.

Mixed organic polydiorganosiloxane polymers may also be used, such as polyoxyalkylene-polyorganosiloxane block copolymers, phosphoric esters (FR-A-No. 2,372,203), trioctyl phosphate (FR-A-No. 2,415,132), dialcohol esters of dicarboxylic acids (U.S. Pat. No. 2,938,007) and cycloalkylbenzenes (FR-A-No. 2,392,476).

The products of alkylation of benzene with a molecular weight above 200, in particular alkylbenzenes and polyalkylbenzenes, are the preferred organic plasticizers.

The compositions according to the invention may be optionally employed after dilution in liquid organic compounds. Such diluents are preferably the typical commercial products which include:

(i) aliphatic, cycloaliphatic or aromatic hydrocarbons, halogenated or otherwise, such as n-heptane, n-octane, cyclohexane, methylcyclohexane, toluene, xylene, mesitylene, cumene, tetralin, perchloroethylene, trichloroethane, tetrachloroethane, chlorobenzene and orthodichlorobenzene;

(ii) aliphatic and cycloaliphatic ketones such as methyl ethyl ketone, methyl isobutyl ketone, cyclohexanone and isophorone; and (iii) esters such as ethyl acetate, butyl acetate and ethylglycol acetate.

The amount of diluent generally remains low; it is generally below 50% by weight relative to the total weight of the composition.

According to this invention, it has been possible to demonstrate that the adhesiveness of the elastomer to various substrates, in particular wood and aluminum, can be greatly improved by adding, per 100 parts by weight of the sum of the weight of the constituents (A), (B) and (C), from 0.1 to 10, preferably from 1 to 5 parts by weight of at least one adhesion promoter (E) notably having the formula:

$$Y_n Si(OY')_{4-n}$$

in which Y is a saturated or unsaturated $C_1$–$C_{10}$ hydrocarbon radical and Y' is a $C_1$–$C_8$ alkyl radical or a $C_3$–$C_6$ alkoxyalkylene radical, n is 1 or 0 and $C_1$–$C_4$-alkyl polysilicates, in particular methyl polysilicate and ethyl polysilicate.

Mixtures of these adhesion promoters can also be employed, in particular the mixture of methyl silicate and methyl polysilicate.

The preferred adhesion promoters (E) are:

| | |
|---|---|
| $CH_2=CHSi(OCH_3)_3$ | vinyltrimethoxysilane |
| $CH_2=CHSi(OCH_2CH_2OCH_3)_3$ | vinyltris(methoxyethoxy)silane |
| $Si(OCH_3)_4$ | methyl silicate |
| $Si(OCH_2CH_2OCH_3)_4$ | tetra(methoxyethoxy)silane |
| — | methyl polysilicate and ethyl polysilicate. |

The formulation of the compositions according to the invention is carried out in two steps. Consistent therewith, a first component is prepared by mixing, in the absence of moisture, the constituents (A), (B), (C), optionally (E) and optionally the usual additives and adjuvants.

This first component is stable in storage and cures only on being exposed to moisture in the surrounding air.

In a second step, the hardening agents (D) constituting the second component are added to (and homogenized with) these single-component compositions, at the time of use.

In a preferred embodiment of the invention, to make it easier to incorporate the hardening agent (D), the second component contains the hydrogel, dispersed in the form of small particles within a paste. This paste is produced by homogenizing a filler, optionally a diluent or a plasticizer and hydrogel, using a kneader.

The plasticizer may be all or a portion of the plasticizer (1f) to (4f) of the first component and/or a fraction (up to one half) of the oil (A). Similarly, the filler may be a fraction (a few %) of the filler (C).

The present invention also features the use of the subject fast-curing compositions to produce seals.

The compositions in accordance with the invention may be used for many applications such as sealing in the building industry, the assembly of the widest variety of materials (metals, plastics, natural and synthetic rubbers, wood, cardboards, earthenware, brick, ceramic, glass, stone, concrete, masonry components), insulation of electrical conductors, encapsulation of electronic circuits, and the preparation of molds suitable for the production of articles made of synthetic resins or foams.

In addition, they are more especially suitable for the production of "in situ" seals employed in the motor vehicle industry. These "in situ" seals include a number of types, namely "squashed" seals, "shaped" seals and "injected" seals.

The "squashed" seals are formed as a result of the application of a pasty bead of the compositions onto the area of contact between two metal components to be assembled. The pasty bead is first deposited onto one of the components and then the other component is immediately applied onto the first. This results in a squashing of the bead before it is converted into an elastomer. Seals of this type apply to assemblies which do not generally have to be disassembled (oil sump seals, timing case seals, etc.).

The "shaped" seals are also obtained as a result of the application of a pasty bead of the compositions onto the area of contact between 2 components to be assembled. However, after the deposition of the pasty bead onto one of the components, a complete curing of the bead into an elastomer is effected and it is only then that the second component is applied onto the first. Consequently, an assembly of this kind can be easily disassembled, since the component which is applied onto that having the seal does not adhere to such seal. Furthermore, because of its rubbery nature, the seal adapts to all the nonuniformities of the surfaces to be joined; as a result, there is no need (1) to carefully machine the metal surfaces which are to be placed in contact with one another, and (2) to strongly clamp the assemblies obtained. These features make it possible to avoid to some extent the fixing seals, spacers and ribs which are usually intended to stiffen and strengthen the assembly components.

Since the compositions in accordance with the invention cure rapidly on being heated in a confined environment or in the open air, this means that the "shaped" seals (and also the other "in situ" seals) produced by curing these compositions can be produced under highly constricting conditions of industrial manufacture. They can be manufactured, for example, on the usual assembly lines of the motor vehicle industry, which are equipped with an automatic tool for depositing the compositions. This automatic tool quite frequently has a mixer head equipped with a heating system and a deposition nozzle, the latter translating the outline of the seals to be produced. The mixing head can receive the single-component polysiloxane composition and the accelerator.

The compositions produced and distributed by means of this tool must have a cure time which is well adjusted in order, on the one hand, to avoid setting solid in the mixing head and, on the other hand, to provide complete crosslinking when the deposition of the pasty bead onto the components to be sealed has been completed. These "shaped" seals are more especially suitable for rocker-box seals, gearbox covers, timing spacers and even oil sumps, etc. To interrupt the deposition of the seal, it is sufficient to switch off the heating of the mixing head and/or to stop the delivery of the dopant agent, and at least 10 minutes are then available at ambient temperature to purge the organopolysiloxane composition from the mixing head, if desired, before the composition sets solid when the line stoppage is longer than the time after which the composition begins to cure.

Injected seals are formed in a confined atmosphere, in cavities which are frequently completely enclosed. The compositions placed in these cavities are quickly converted into elastomers whose properties are identical with those of elastomers originating from the curing of the compositions in the open air. These seals may be used, for example, for sealing crankshaft bearings.

The compositions according to the invention are also suitable for the production of quick-curing seals in fields other than motor vehicle manufacture. Thus, they can be used for the adhesive bonding and sealing of electrical boxes made of plastic, and for producing seals for vacuum cleaners and for steam irons.

The elastomers produced by curing the compositions of the invention have mechanical properties which are identical with those of the elastomers originating from the known single-component compositions which are, therefore, produced merely by mixing the constituents (A), (B), (C) and, optionally, usual additives without the introduction of (D). In particular, the residual compression set (RCS) values are relatively low, on the order of 8 to 35% for example. Furthermore, complete crosslinking, after heating, as measured by the Shore A hardness, is obtained immediately at the end of the crosslinking periods referred to previously, which generally last from a few minutes to 60 minutes, occasionally longer, but never more than 8 hours. In the case of single-component compositions, complete crosslinking requires several days under the most favorable conditions. Furthermore, mere introduction of water, without hydrogel, into the single-component compositions, although substantially accelerating the curing process, does not permit them to be properly crosslinked.

In order to further illustrate the present invention and the advantages thereof, the following specific examples are given, it being understood that same are intended only as illustrative and in nowise limitative.

In said examples to follow, all parts and percentages are given by weight, unless otherwise indicated.

COMPARATIVE EXAMPLE 1 AND EXAMPLES 2 TO 5

A composition (A) which cures into an elastomer at ambient temperature and above in the presence of atmospheric moisture was prepared by mixing the following constituents:

178 parts: $\alpha,\omega$-(dihydroxy)polydimethylsiloxane oil ($O_1$) having a viscosity of 20,000 mPa.s at 25° C.;
534 parts: $\alpha,\omega$-(dihydroxy)polydimethylsiloxane oil ($O_2$) having a viscosity of 3,500 mPa.s at 25° C.;
93 parts: pyrogenic silica (A 200) having a BET specific surface area of 200 m²/g treated with octamethylcyclotetrasiloxane;
170 parts: ground quartz having a mean particle diameter of 5 μm; and
30 parts: methyltriacetoxysilane.

This composition (A) was fluid and stable in a closed anhydrous environment.

5 pastes ($B_1$ to $B_5$) were prepared separately, each containing a particular system for curing the composition (A). The nature of the constituents, together with the amounts in parts by weight of these pastes ($B_1$ to $B_5$) are reported in Table 1 below:

TABLE 1

| CONSTITUENTS OF EACH PASTE | $B_1$ | $B_2$ | $B_3$ | $B_4$ | $B_5$ |
|---|---|---|---|---|---|
| Oil $O_1$ | 85.5 | 85.5 | 85.4 | 85.4 | 85.4 |
| Oil $O_2$ | 7.25 | 7.25 | 7.25 | 7.25 | 7.25 |
| Silica A 200 | 2.75 | 2.75 | 2.75 | 2.75 | 2.75 |
| Aqua Keep 10 SHP | — | 0.06 | 0.18 | — | — |
| Xanthan gum | — | — | — | 0.18 | — |
| Carboxymethyl cellulose | — | — | — | — | 0.18 |
| Water introduced | 4.5 | 4.5 | 4.5 | 4.5 | 4.5 |

The procedure used to prepare the pastes $B_1$ to $B_5$ was as follows:

The water and the hydrogel (except for the paste $B_1$) were first introduced into a turbine blender. The mixture was maintained stirred vigorously (200 revolutions/min) until a homogeneous gel was produced.

The oils $O_1$, $O_2$ and the silica were then added to the turbine blender. The compositions $B_1$ to $B_5$ were then devolatilized for 2 min at 1.33 kPa, were cooled to 25° C. and were stored in the absence of air.

Aqua Keep R 10 SHP is an alkali metal acrylate polymer marketed by Norsolor.

The xanthan gum was Rhodopol 23, marketed by Rhône-Poulenc.

The carboxymethyl cellulose, in the form of its sodium salt, is marketed by Prolabo.

5.5 parts of the pastes ($B_1$ to $B_5$) were added to 100 parts of composition A to produce the compositions of Examples 1 to 5; the time of addition of the pastes B to the composition A was approximately 2 minutes. The compositions obtained were immediately spread out in the form of a layer 4 mm in thickness on steel plates heated to various temperatures (T) inside thermostated enclosures.

The composition layer deposited on each plate was converted into a rubbery strip. The time to, in min, at the end of which the Shore A hardness was measurable, on the one hand, and the time tm, in min, at the end of which the Shore A hardness reached its maximum value (approximately 42), were measured. The times to and tm were measured from the instant when the plates were placed in the heated enclosures. All of the above operations were carried out under a nitrogen atmosphere.

The results are reported in Table 2 below:

TABLE 2

| | to Examples | | | | |
|---|---|---|---|---|---|
| T | 1 | 2 | 3 | 4 | 5 |
| 22° C. | 120 | 15 | 25 | 60 | 30 |
| 30° C. | 75 | 8 | 16 | 35 | 18 |
| 40° C. | 35 | 4 | 10 | 20 | 10 |
| 50° C. | 12 | immediate setting | 5/6 | 10 | 5/6 |

| | tm Examples | | | | |
|---|---|---|---|---|---|
| T | 1 | 2 | 3 | 4 | 5 |
| 22° C. | 7 h | 3 h | 3 h, 30 min | 5 h | 3 h, 30 min |
| 30° C. | 4 h | 1 h, 45 min | 1 h, 55 min | 3 h, 15 min | 2 h, 10 min |
| 50° C. | 2 h | 1 h | 1 h, 10 min | 1 h, 45 min | 1 h, 20 min |

From Table 2, it will be seen that, for a specified composition, a wide range of cure times was available as a function of the temperature T. It was seen, furthermore, that the shortest cure time was obtained with Aqua Keep 10 SHP. Furthermore, the presence of hydrogel shortened the cure time, compared with the time obtained for the Comparative Example 1 without hydrogel.

EXAMPLES 6 TO 8

A composition (C) curing to an elastomer at ambient temperature and above in the presence of atmospheric moisture was prepared by mixing the following constituents:

500 parts of an $\alpha,\omega$-(dihydroxy)polydimethylsiloxane oil $O_3$ having a viscosity of 70,000 mPa.s at 25° C.;
70 parts of pyrogenic silica having a BET specific surface area of 60 m²/g treated with octamethylcyclotetrasiloxane;
2.5 parts of rutile-type titanium dioxide having a mean particle diameter of 5 μm;
20 parts of methyltriacetoxysilane; and
0.2 part of butyl titanate.

3 pastes ($D_1$, $D_2$ and $D_3$) containing a hydrogel of acrylic type were prepared separately; the nature of the constituents and their amounts in parts by weight, of these pastes are reported in Table 3 below:

TABLE 3

| CONSTITUENTS OF EACH PASTE | $D_1$ | $D_2$ | $D_3$ |
| --- | --- | --- | --- |
| Oil $O_1$ | 85.5 | 85.5 | 85.4 |
| Oil $O_2$ | 7.25 | 7.25 | 7.25 |
| Silica A 200 | 2.75 | 2.75 | 2.75 |
| Aqua Keep 10 SHP | 0.03 | 0.06 | 0.18 |
| Water introduced | 4.5 | 4.5 | 4.5 |

The oil $O_1$, the silica A 200 and Aqua Keep 10 SHP are described in Example 1 above.

The oil $O_4$ was an $\alpha,\omega$-(trimethylsiloxy)polydimethylsiloxane plasticizing oil having a viscosity of 1,000 mPa.s at 25° C.

The operating procedure for preparing the pastes ($D_1$ to $D_3$) was identical to that for the pastes ($B_1$ to $B_5$) in Examples 1 to 5 above.

5.2 parts of the pastes ($D_1$, $D_2$, $D_3$) were added to 100 parts of the composition (C) to produce the compositions of Examples 6 to 8; the time for incorporation of the pastes (D) into the composition (C) was approximately 2 minutes. The compositions produced were immediately spread out in the form of a layer 4 mm in thickness on steel plates heated to various temperatures (T) inside thermostatted enclosures.

The composition layer deposited onto each plate was converted into a rubbery strip whose Shore A hardness was determined as a function of time. The time to, in min, at the end of which the Shore A hardness was measurable, on the one hand, and the time tm, in min, at the end of which the Shore A hardness reached its maximum value (approximately 31) were measured. The times to and tm were measured from the instant when the plates were placed in the heated enclosures. All of the above operations were carried out under a nitrogen atmosphere. The results are reported in Table 4 below:

TABLE 4

| T | to Examples | | |
| --- | --- | --- | --- |
| | 6 | 7 | 8 |
| 22° C. | 12 | 17 | 21 |
| 30° C. | 8 | 12 | 15 |
| 40° C. | 4 | 7 | 9 |
| 50° C. | immediate setting | ¾ | ¾ |

| T | tm Examples | | |
| --- | --- | --- | --- |
| | 6 | 7 | 8 |
| 22° C. | 2 h, 10 min | 2 h, 35 min | 3 h, 20 min |
| 30° C. | 1 h, 25 min | 1 h, 45 min | 2 h |
| 50° C. | 30 min | 40 min | 45 min |

From Table 4, it will be seen that, for a specified composition, a wide range of vulcanization periods was available as a function of the temperature T. It will also be seen, furthermore, that for the same amount of water which was introduced, the shortest cure times were realized with the lowest amounts of Aqua Keep.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An organopolysiloxane composition curable into elastomeric state in a confined atmosphere, comprising:
   (A) 100 parts of an $\alpha,\omega$-di(hydroxy)diorganopolysiloxane polymer having a viscosity of 700 to 1,000,000 mPa.s at 25° C., each comprising recurring diorganosiloxy units of the formula $R_2SiO$, in which the symbols R, which may be identical or different, are each a hydrocarbon radical containing from 1 to 8 carbon atoms, or a substituted such radical bearing one or more halogen atom or cyano substituents;
   (B) 2 to 20 parts of a crosslinking agent having the general formula:

   $R_pSi(OCOR')_{4-p}$ in which the symbol R is as defined above under (A), the symbol R' is a hydrocarbon radical devoid of aliphatic unsaturation, containing from 1 to 15 carbon atoms, and the symbol p represents 0 to 1;
   (C) 0 to 150 parts of inorganic fillers; and
   (D) 0.01 to 10 parts, per 100 parts of (A)+(B)+(C), of a hydrogel comprising one part of a colloid of natural or synthetic origin and at least five parts of water.

2. The organopolysiloxane composition as defined by claim 1, wherein the colloid comprises an alkali metal acrylate and/or methacrylate group and at least 20 parts of water per part of colloid.

3. The organopolysiloxane composition as defined by claim 2, said hydrogel comprising at least 50 parts of water per part of colloid.

4. The organopolysiloxane composition as defined by claim 2, wherein the colloid comprises an alkali metal acrylate polymer prepared by polymerization of acrylic acid and an alkali metal acrylate in aqueous suspension.

5. The organopolysiloxane composition as defined by claim 1, wherein the radicals R bonded to the silicon atoms of the diorganopolysiloxane (A) are each:
   (i) alkyl or haloalkyl radicals containing from 1 to 8 carbon atoms;

(ii) cycloalkyl or halocycloalkyl radicals containing from 4 to 8 carbon atoms;
(iii) alkenyl radicals containing from 2 to 4 carbon atoms;
(iv) aryl or haloaryl radicals containing from 6 to 8 carbon atoms; or
(v) cyanoalkyl radicals, the alkyl moiety of which containing from 2 to 3 carbon atoms.

6. The organopolysiloxane composition as defined by claim 1, wherein the polyacyloxysilane (B) has the formula:

$$R_p Si(OCOR')_{4-p}$$

in which the symbol p represents 0 or 1, and the symbols R' are:
(i) alkyl radicals containing from 1 to 15 carbon atoms;
(ii) cycloalkyl radicals containing from 5 to 6 ring carbon atoms; or
(iii) aryl radicals containing from 6 to 8 carbon atoms.

7. An elastomer comprising the organopolysiloxane composition as defined by claim 1, in cured elastomeric state.

8. A seal comprising the elastomer as defined by claim 7.

9. The organopolysiloxane composition as defined by claim 7, said constituents (A) and (B) comprising the devolatilized products emanating from the stoichiometric reaction of (A) with (B).

10. The organopolysiloxane composition as defined by claim 1, further comprising a curing catalyst.

11. The organopolysiloxane composition as defined by claim 1, further comprising, per 100 parts of the sum of the constituents (A), (B) and (C), from 0.1 to 10 parts by weight of at least one of the following adhesion promoters (E) having the formula:

$$Y_n Si(OY')_{4-n}$$

in which Y is a saturated or unsaturated $C_1$-$C_{10}$ hydrocarbon radical and Y' is a $C_1$-$C_8$ alkyl radical or a $C_3$-$C_6$ alkoxyalkylene radical, and n is 1 or 0.

12. The organopolysiloxane composition as defined by claim 11, said at least one adhesion promoter (E) comprising methyl silicate, tetra(methoxyethoxy)silane, or admixture thereof.

13. The organopolysiloxane composition as defined by claim 1, further comprising a plasticizer.

14. The organopolysiloxane composition as defined by claim 13, said plasticizer comprising an alkyl benzene or polyalkylbenzene having a molecular weight greater than 200.

15. The organopolysiloxane composition as defined by claim 1, said fillers (C) comprising silica particulates.

16. The organopolysiloxane composition as defined by claim 1, further comprising a diluent.

17. The organopolysiloxane composition as defined by claim 1 including a mixture of $\alpha,\omega$-di(hydroxy)diorganopolysiloxane polymers.

* * * * *